United States Patent [19]

Tachibana

[11] 4,045,722

[45] Aug. 30, 1977

[54] POWER CONVERTER SYSTEM

[75] Inventor: Kyozo Tachibana, Naka, Japan

[73] Assignee: Hitachi, Ltd., Japan

[21] Appl. No.: 678,175

[22] Filed: Apr. 19, 1976

[30] Foreign Application Priority Data

Apr. 28, 1975 Japan .................................. 50-51864

[51] Int. Cl.² ......................................... H02M 7/155
[52] U.S. Cl. .................................. 363/126; 363/128;
363/129
[58] Field of Search .................. 321/5, 27 R, 47, 45 C

[56] References Cited

U.S. PATENT DOCUMENTS

| 3,170,106 | 2/1965 | Rosenstein | 321/5 |
| 3,525,030 | 8/1970 | Hammond et al. | 321/5 |
| 3,568,032 | 3/1971 | Mages | 321/5 |
| 3,675,110 | 7/1972 | Kelley, Jr. | 321/5 X |
| 3,857,083 | 12/1974 | Lundström | 321/27 R X |
| 3,953,781 | 4/1976 | Forster et al. | 321/27 R |

Primary Examiner—William M. Shoop

Attorney, Agent, or Firm—Craig and Antonelli

[57] ABSTRACT

A power converter system comprises a connection of a plurality of controlled rectifiers and a plurality of uncontrolled rectifiers, or a connection of only a plurality of controlled rectifiers. With an AC power supply as an input, the firing phase of the controlled rectifiers is controlled for conversion into a desired power. The commutating operation of the rectifiers is performed by utilizing the AC power supply. A retardation coil is connected to each of the rectifiers connected in series in the same polarity and making up an arm of the connection. The thus connected retardation coils are magnetically coupled with each other. The inductance of the commutating circuit is smaller when the output of the power converter is substantially maximum or minimum than the inductance when the output of the system is not maximum or minimum, thereby effectively reducing the higher harmonics components of the AC input current of the system at the time of commutating operation of the rectifiers without reduction of the utility of the converter.

18 Claims, 15 Drawing Figures

POWER CONVERTER SYSTEM

BACKGROUND OF THE INVENTION

This invention relates to a power converter composed of a plurality of rectifiers for producing a desired DC or AC output with an AC power supply as its input, or more in particular to a power converter system in which a higher harmonics current generated at the AC power supply side at the time of commutation of the rectifiers may be reduced.

A power converter system of this type is composed of a bridge connection of controlled rectifiers and a plurality of uncontrolled rectifiers or a bridge connection of only a plurality of controlled rectifiers and the firing phase of the controlled rectifiers is controlled for conversion from AC into DC power.

Such a power converter system utilizes the input AC power supply without using any special power supply for the commutation of the rectifiers. The quantity of electricity at the load side of the power converter, such as the rectified voltage or the rectified current is subject to a pulsation due to the voltage waveform of the AC power supply. In many cases, this pulsation is reduced by inserting a filter or a smoothing reactor between the power converter system and the load, thus damping the pulsation of the power supplied to the load.

Notwithstanding, the problem posed by the power converter system of this type in operation is the higher harmonics current produced at the AC power supply side by the commutation of the rectifiers. Essentially, the functions of a rectifier are limited to the conduction and cut-off of current flowing therein. At the time of commutation of the rectifier, therefore, the AC current at the AC power supply side undergoes a sharp change and takes a form similar to a rectangular wave. The AC power supply thus comes to contain higher harmonics components.

The power converter system, when mounted on an electric car, for example, causes such higher harmonics current to have an adverse effect on nearby communication equipment through the trolley wires, resulting in an inductive interference or other troubles.

A method has been so far suggested in which a retardation coil is inserted in the AC circuit connecting the AC power supply and the power converter system, so that the variations of the AC input current at the time of commutation of the rectifiers is dampened by the inductance of the retardation coil to thereby reduce the higher harmonics current.

Even though the retardation coil is effective for reduction of the higher harmonics current, an increased inductance in the AC circuit generally causes a decreased power factor, thereby giving rise to a reduced output of the power converter system. The result is in that it is necessary to increase the size and capacity of not only the power converter system but also the device on the AC power supply side in order to attain a desired output.

Take a single-phase rectifier circuit as an example of the power converter system. The variations of the AC input current due to the combination of the rectifiers depend on the voltage magnitude of the AC power supply itself as a source of the commutation energy. In the event that the voltage of the AC power supply takes a sinusoidal waveform, the variations of the AC input current are sharp at or near the 90° phase of the AC voltage associated with the commutation, and slow at or near 0° or 180°.

Therefore, if the inductance of the commutation circuit making up a passage of the commutation current is smaller at a maxiumum or minimum output of the power converter system than the inductance when the output is not maximum or minimum, the higher harmonics components of the AC input current may be generally reduced on the one hand and the efficiency of the power converter system can be improved on the other. It is from this point of view that the present invention has been made.

SUMMARY OF THE INVENTION

An object of the present invention is to provide a power converter system in which the higher harmonics components in the AC input current are reduced while at the same time improving the efficiency of the system.

The power converter system according to the present invention is composed of a plurality of rectifiers to produce a desired DC or AC output in response to an input from an AC power supply. A plurality of retardation coils which are magnetically coupled are inserted in series with the rectifiers in the commutation circuit using the AC power supply as a commutation power supply.

DESCRIPTION OF THE PREFERRED EMBODIMENTS

Figure 1:
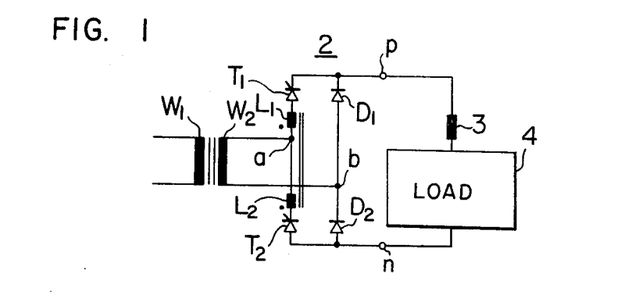
FIG. 1 is a diagram showing an embodiment of the power converter system according to the present invention as applied to a single-phase rectifier circuit.

An embodiment of the present invention involving an example of a single-phase rectifier circuit is shown in FIG. 1. In the drawing, a rectifier circuit 2 is constituted by arms having controlled rectifiers $T_1$ and $T_2$ (hereinafter referred to as the "thyristors") and other arms having uncontrolled rectifiers $D_1$ and $D_2$. The anode of the thyristor $T_1$ is connected in series with a retardation coil $L_1$, while the cathode of the thyristor $T_2$ is connected in series with a retardation coil $L_2$. The retardation coils $L_1$ and $L_2$ are magnetically coupled with each other in the polarities shown in FIG. 1.

The respective AC input terminals of the rectifier circuit 2 are connected with the terminals $a$ and $b$ of the secondary winding $W_2$ of a transformer 1, while the primary winding $W_1$ thereof is connected to an AC power supply not shown in the drawing. A series circuit of a smoothing reactor 3 and a DC load 4 such as a DC motor is connected between DC output terminals $p$ and $n$ of the rectifier circuit 2.

The commutation of the thyristors $T_1$ and $T_2$ and the diodes $D_1$ and $D_2$ of the rectifier circuit 2 is effected by utilizing the AC power supply.

Figure 2:
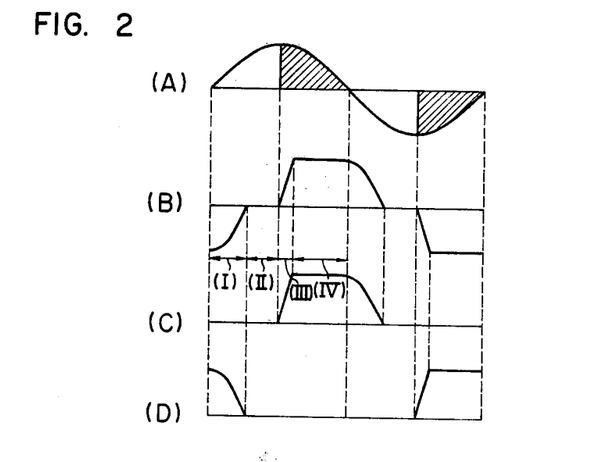
FIG. 2 is a diagram showing voltage and current waveforms associated with the firing angle of 90° in FIG. 1.

The operation of the rectifier circuit 2 will be described below. First, the operation of the retardation coils $L_1$ and $L_2$ with a firing phase of near 90° of the thyristors $T_1$ and $T_2$ where the variation of the AC input current to the rectifier circuit 2 is very sharp will be explained with reference to the diagrams of FIGS. 2 and 3. In FIG. 2 showing voltage and current waveforms, the curve (A) represents an AC voltage waveform induced in the secondary winding $W_2$ of the transformer 1, the curve (B) an AC current waveform flowing in the secondary winding $W_2$, the curve (C) a current waveform flowing in the thyristor $T_1$, and the curve (D) a current waveform flowing in the thyristor $T_2$. The shadowed parts of the AC voltage waveform (A) show voltages to be obtained between the DC output terminals $p$ and $n$ of the rectifier circuit 2.

Generally, the rectifier 2 is such that the respective firing phases of the thyristors $T_1$ and $T_2$ are controlled to be the same in the positive and negative half cycles of the AC voltage, and therefore the following description will be made only with reference to the positive half cycle as a case representing both cases.

The AC current waveform (B) of FIG. 2 may be divided into the modes (I) to (IV) depending on the commutating operation of the thyristors $T_1$ and $T_2$ and the diodes $D_1$ and $D_2$ with a firing phase of near 90°.

The respective circuit conditions associated with the modes (I) to (IV) are shown in FIGS. 3A to 3D. In these drawings, thick lines show the passage of current and dashed lines the passage of the commutation current $i_C$.

Figure 3A:
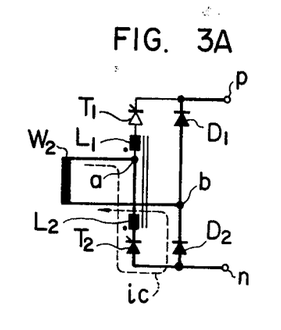
FIGS. 3A, 3B, 3C and 3D are diagrams for explaining the commutating operation associated with the firing angle of 90° in FIG. 1.

In FIG. 3A showing the circuit condition of mode (I) in FIG. 2, the conductive state of the diode $D_1$ and the thyristor $T_2$ changes to a state where the diode $D_2$ begins natural conduction by the change of the AC voltage of the secondary winding $W_2$ from a negative to a positive level. In other words, FIG. 3A shows a circuit condition in the process of commutation from the thyristor $T_2$ to the diode $D_2$. A commutation circuit or a closed loop consisting of the retardation coil $L_2$, the thyristor $T_2$ and the diode $D_2$ is formed between the terminals $a$ and $b$. The commutation current $i_C$ flows in this loop in the direction shown by an arrow in the drawing thereby to turn off the thyristor $T_2$.

The variation of the commutation current $i_C$ is dampened by the operation of the retardation coil $L_2$, with the result that the variation of the AC current in the mode (I) is less sharp than in the absence of the retardation coil $L_2$.

Figure 3B:
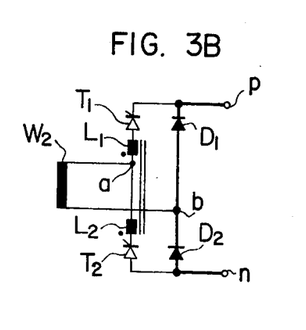

When the thyristor $T_2$ is thus turned off, a transfer is made to the condition associated with the mode (II) of FIG. 2. The circuit condition associated with the mode (II) is shown in FIG. 3B. Under this condition, the diodes $D_1$ and $D_2$ conduct and therefore no current flows in the AC circuit, while a DC current flows from the terminal p, through the smoothing reactor 3, the DC load 4, the terminal $n$, the diode $D_2$, the terminal $b$ to the diode $D_1$. The thyristor $T_1$, which is impressed with a forward voltage, is ready to enter a conductive state if fired.

Figure 3C:
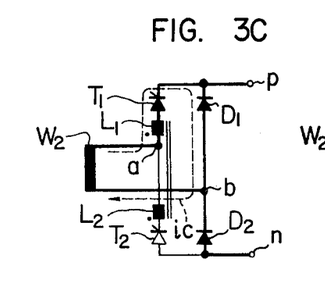

The very instant the thyristor $T_1$ is fired at or near the phase angle of 90°, a change is made to the condition of mode (III) in FIG. 2. The circuit condition associated with the mode (III) is illustrated in FIG. 3C. This condition represents the process of commutation from diode $D_1$ to thyristor $T_1$. A commutation circuit or a closed circuit is formed of the retardation coil $L_1$, the thyristor $T_1$ and the diode $D_1$. In this closed loop, the commutation current $i_C$ flows in the direction shown by the arrow thereby to turn off the diode $D_1$. The variation of the commutation current $i_C$ is dampened by the operation of the retardation coil $L_1$, so that the variation of the AC current under the mode (III) is more gentle than in the absence of the retardation coil $L_1$.

Figure 3D:
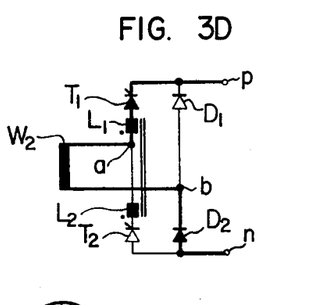

With the turning off of the diode $D_1$, a change is made to the mode (IV) of FIG. 2. The circuit condition associated with the mode (IV) is shown in FIG. 3D. Under this condition, the AC voltage across the secondary winding $W_2$ is rectified by the rectifier circuit 2 and a DC voltage is applied to the DC load 4; and the current flows from the terminal $a$, through the retardation coil $L_1$, the thyristor $T_1$, the terminal $p$, the smoothing reactor 3, the DC load 4, the terminal $n$, the diode $D_2$ to the terminal $b$.

This state transfers to the next half cycle of negative polarity of the AC voltage, where an operation similar to that in the preceding positive half cycle is repeated.

As will be seen from the foregoing description, the current variation is dampened by the functions of the retardation coils $L_1$ and $L_2$ and therefore it is possible to reduce the generation of harmonics current at or near the firing phase of 90° where the variation in the AC current is sharpest when commutation of the thyristor or diode is effected. This effect is of course not limited to the firing phase of 90° but the variation of the AC current is dampened by the retardation coils even in the midst of the control of the firing phase.

Under the condition where the output of the rectifier circuit is maximum or minimum, the variation in the AC current is originally gentle. The function of the retardation coils at the firing phase of zero degree where the output of the rectifier circuit is maximum will be explained with reference to FIGS. 4 and 5.

Figure 4:
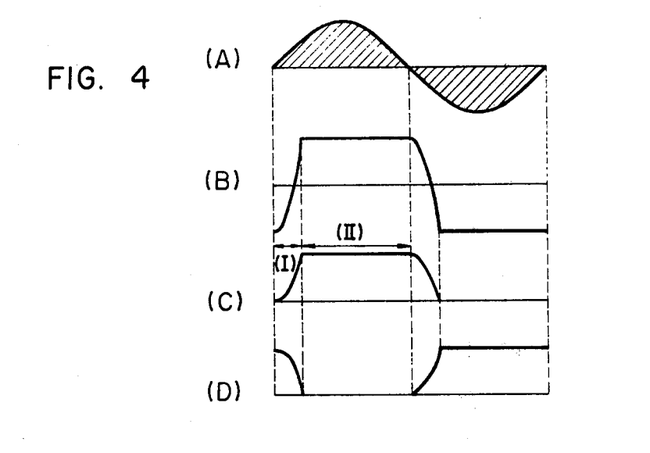
FIG. 4 shows voltage and current waveforms with the firing phase of zero degree in FIG. 1.
Figure 5A:
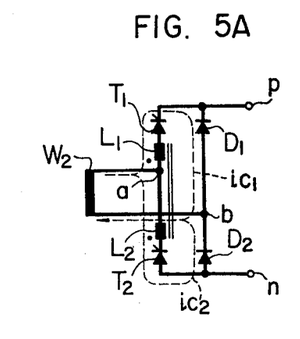
FIGS. 5A and 5B are diagrams for explaining the commutating operation with the firing phase of zero degree in FIG. 1.
Figure 5B:
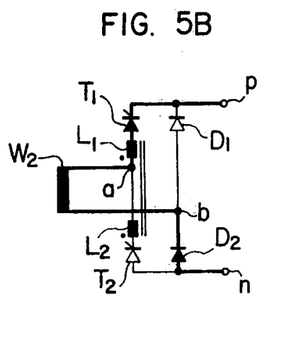

As in FIG. 2, FIG. 4 shows voltage and current waveforms, in which curve (A) shows an AC voltage waveform, curve (B) an AC current waveform, curve (C) a waveform of the current flowing in the thyristor $T_1$, and curve (D) a waveform of current flowing in the thyristor $T_2$. FIG. 5A shows the circuit condition associated with the mode (I) in FIG. 4, and FIG. 5B that associated with the mode (II).

At the firing phase of 0°, a positive half cycle of the AC voltage, for example, may be divided into two operating modes (I) and (II). In the condition immediately preceding to the mode (I), the thyristor $T_2$ and the diode $D_1$ are in conductive state. The mode (I) is such that, the instant the polarity of the AC voltage changes from negative to positive, the thyristor $T_1$ is fired and the diode $D_2$ enters a natural conduction. In other words, the mode (I) represents a process of commutation both from diode $D_1$ to thyristor $T_1$ and from thyristor $T_2$ to diode $D_2$ at the same time.

A commutation circuit or a closed loop is formed of the terminal $a$, the retardation coil $L_1$, the thyristor $T_1$, the diode $D_1$ and the terminal $b$, while another commutation circuit or closed circuit is made up of the terminal $a$, the retardation coil $L_2$, the thyristor $T_2$, the diode $D_2$ and the terminal $b$, as shown in FIG. 5A. In these two circuits, the commutation currents $i_{C1}$ and $i_{C2}$ flow in the directions shown by arrows thereby to turn off the diode $D_1$ and the thyristor $T_2$. If the respective impedances of these circuits are equal, the commutation currents $i_{C1}$ and $i_{C2}$ in the circuits are also identical with each other. The retardation coils $L_1$ and $L_2$ are magnetically coupled with each other through a single magnetic core and arranged such that the directions of flow of the commutation currents flowing therethrough are opposite to each other. Accordingly, even if the currents flowing in the two coils wound on the single magnetic core vary, the resulting variations in the magnetomotive force due to the two coils are cancelled each other, so that the retardation coils offer no inductance.

This period falls on the range with a small AC voltage value. During this period, therefore, the commutation current is originally subject to a gentle variation, and the variation in the operation of retardation coils does not cause any increase in the higher harmonics component of the AC current. With the turning off of the thyristor $R_2$ and the diode $D_1$ upon completion of the commutation, a change is made to the mode (II). The circuit condition associated with the mode (II) is shown in FIG. 5B. A current flows from the terminal a, through the retardation coil $L_1$, the thyristor $T_1$, the terminal p, the smoothing reactor 3, the DC load 4, the terminal n, the diode $D_2$ to the terminal b, thereby effectively supplying a DC voltage to the load 4.

This circuit condition of mode (II) is followed by a negative half cycle, the operation during which is similar to that in the positive half cycle and will not be described.

It will be understood from the foregoing description that, in the embodiment of FIG. 1, the variation in AC current which otherwise causes higher harmonics current is effectively discouraged by the inductance of the retardation coils in the midst of control operation at or near the firing phase of 90°. At the firing phase of 0° or 180° where the output of the rectifier circuit is maximum or minimum, the retardation coils function not to offer any inductance, thus preventing a uselessly lengthened commutation resulting in an improved effeciency of the rectifier circuit.

In the circuit of FIG. 1, it sometimes occur that a high reverse voltage as described below is applied to the thyristor $T_2$ in the mode (III) of FIG. 2. Under this condition, a closed loop is formed between the AC terminals a and b, consisting of the retardation coil $L_1$, the thyristor $T_1$ and the diode $D_1$. The voltage produced across the secondary winding $W_2$ is applied to the retardation coil $L_1$. Since the voltage at the terminal a l is positive with respect to that at the terminal b the voltage applied to the retardation coil $L_1$ is positive at the side marked with a black dot in the drawing. On the other hand, the retardation coil $L_2$, which is magnetically coupled with the retardation coil $L_1$ through a common magnetic core, has a voltage induced therein which is positive also at the side marked with a black dot. This induced voltage depends on the turn ratio between the retardation coils $L_2$ and $L_1$. If the turn ratio is set at 1, the induced voltage is identical with the voltage induced in the secondary winding $W_2$. The diode $D_2$ is, on the other hand, in a conductive state. A voltage twice the voltage across the secondary winding $W_2$ is applied to the thyristor $T_2$ through a passage including the secondary winding $W_2$, the terminal a, the retardation coil $L_2$, the thyristor $T_2$, the diode $D_2$, the terminal b and back to the secondary winding $W_2$. This voltage is opposite in direction to the forward flow in the thyristor $T_2$. Such a voltage is generated also in the thyristor $T_1$ in the next half cycle of the AC voltage. For this reason, it is necessary to provide a reverse breakdown voltage of each of the thyristors $T_1$ and $T_2$ twice as high as that in the absence of the retardation coils.

A number of methods provide a solution to this problem. A first method is to use a thyristor with a reverse breakdown voltage higher than the voltage caused by the retardation coils. A second alternative consists in connecting such a thyristor in series with a diode so that at least part of the reverse voltage is shared by the diode.

Figure 6:
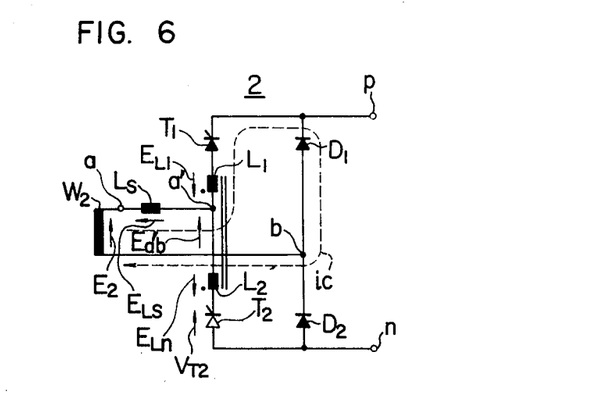
FIGS. 6 to 11 show other embodiments of the power converter system according to the present invention.

A third method for solving the problem is made possible by another embodiment of the invention shown in FIG. 6. In this embodiment, the terminal a of the secondary winding $W_2$ of the transformer is connected to the AC input terminal a' of the rectifier circuit 2 through an additional retardation coil $L_S$, instead of directly connecting of the transformer terminal to the AC input terminal of the rectifier circuit 2 as shown in the embodiment of FIG. 1. Other connections in FIG. 6 are quite the same as in FIG. 1. The diagram of FIG. 6 shows the condition of the circuit having such a connection during the commutation period of mode (III) in FIG. 2. The commutation current component $i_C$ flows in the path from the winding $W_2$ through the terminal a, the retardation coil $L_S$, the terminal a', retardation coil $L_1$, the thyristor $T_1$, the diode $D_1$, the terminal b and back to the winding $W_2$. The voltage $E_2$ produced across the secondary winding $W_2$ is shared by the retardation coils $L_S$ and $L_1$. Let the voltages across $L_S$ and $L_1$ be $E_{LS}$ and $E_{L1}$, and the inductances thereof $L_S$ and $L_1$. The following relation is established among them and the voltage $E_2$:

$$E_{L1} = E_2 \cdot (L_1/L_S + L_1) \quad (1)$$

On the other hand, the voltage $E_{a'b}$ between the AC input terminals a' and b is expressed as $$E_{a'b} = E_{L1} \quad (2)$$

Assume that $$L_S = k.L_1 \quad (3)$$

and that the retardation coils $L_1$ and $L_2$ have the same number of turns. The voltage applied to the retardation coil $L_2$ is $$E_{L2} = E_{L1} = E_2 \cdot (1/k + 1) \quad (4)$$

Therefore, the reverse voltage $V_{T2}$ applied to the thyristor $T_2$ is given by $$V_{T2} = E_{a'b} + E_{L2} + E_{L2}$$

$$V_{T2} = 2E_2 \cdot 1/k + 1 \quad (5)$$

As will be obvious from the equation (5), to the extent that k is larger than 1, the reverse voltage applied to the thyristor $T_2$ may be reduced as compared with the voltage across the secondary winding $W_2$ even in the presence of the retardation coils. Symbol k, as will be noted from equation (3), constitutes a ratio between the respective inductances of the retardation coils $L_S$ and $L_1$, namely, the division ratio of rhe voltage $E_2$. In this way, the additional retardation coil $L_S$ is inserted in the conductor section where the commutation current flows, so that the voltage $E_2$ is shared among the coils $L_S$, $L_1$ and $L_2$, thus permitting the voltage applied to the thyristors $T_1$ and $T_2$ to be reduced below the reverse breakdown voltage thereof.

The third method may be achieved excluding the use of the retardation coil $L_S$ takes advantage of the internal reactance $L_S$ which inherently exists in the transformer 1, the power lines, generator and other power circuit parts not shown. The voltage $E_2$ is shared among the reactance $L_S$, the retardation coils $L_1$ and $L_2$, thus reducing below the reverse breakdown voltage the voltage applied to the thyristor. If the internal reactance $L_S$ of the power circuit such as the transformer 1 is intentionally increased by making positive use of the last-mentioned method, a simple and compact converter system is realized.

In the aforementioned embodiments, the thyristors $T_1$ and $T_2$ of the single-phase bridge rectifier circuit are respectively connected in series with the retardation coils and magnetically coupled with each other through a common magnetic core. The effect of the retardation coils according to the present invention is derived from the fact that a plurality of retardation coils coupled with each other through a common magnetic core are connected to the circuit with different relative times of flow of commutation current and that the retardation coils are coupled with each other with such a polarity that the variations in the magnetomotive force may be cancelled with each other when the respective times of commutation current coincide with each other. Various modifications are therefore possible in arrangement.

Figure 7:
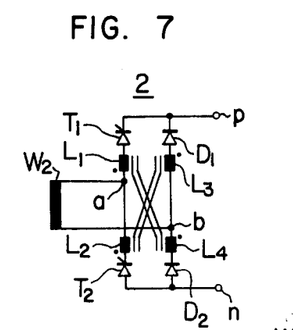

One of the modifications is shown in FIG. 7. This is different from the circuit configuration of FIG. 1 in that the retardation coils $L_3$ and $L_4$ are connected in series with the diodes $D_1$ and $D_2$, that the retardation coils $L_1$ and $L_4$ are magnetically coupled, and that the retardation coils $L_2$ and $L_3$ are also magnetically coupled with each other. Also in the case, the commutation current flowing in the thyristor $T_2$ flows in the diode $D_2$ at the same time, while the commutation current flowing in the thyristor $T_1$ also flows in the diode $D_1$, thus leading to the same advantage as in the preceding embodiment. Preferably, these four retardation coils $L_1$, $L_2$, $L_3$ and $L_4$ may be coupled through a common magnetic core, resulting in a higher efficiency of the magnetic core.

Figure 8:
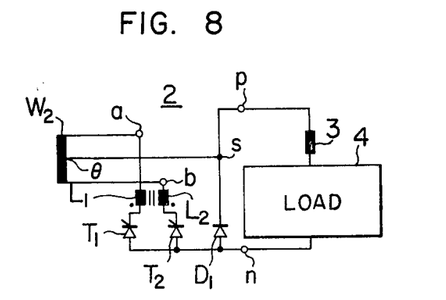

The diagram of FIG. 8 shows an application of the invention to what is called "the center tap type of rectifier circuit." The rectifier circuit 2 is constituted by a diode $D_1$ and two thyristors $T_1$ and $T_2$. The respective anodes of the thyristors $T_1$ and $T_2$ and the diode $D_1$ are connected to a common negative terminal $n$. The secondary winding $W_2$ is provided with the center tap 0 in addition to the opposite end terminals $a$ and $b$. The terminals $s$ of the center tap 0 is connected to the cathode of the diode $D_1$, while the terminals $a$ and $b$ are connected through the retardation coils $L_1$ and $L_2$ to the cathodes of the thyristors $T_1$ and $T_2$ respectively. When the AC voltage is positive, a current flows through the path including the terminal $n$, the thyristor $T_1$, the retardation coil $L_1$, the terminal $a$, the winding $W_2$, the center tap 0, the terminal $s$ and the terminal $p$ thereby to rectify the voltage between the center tap 0 and terminal $a$. When the AC voltage is negative, by contrast, a current flows from the terminal $n$, through the thyristor $T_2$, the retardation coil $L_2$, the terminal $b$, the winding $W_2$, the tap 0, the terminal $s$ to the terminal $p$, thereby rectifying the voltage between the center tap 0 and the terminal $b$. Unless the firing angle of the thyristors $T_1$ and $T_2$ is zero, conduction takes place of the thyristor $T_1$, the diode $D_1$, the thyristor $T_2$, the diode $D_1$ and the thyristor $T_1$ in that order, so that the respective commutation times are different for the thyristors $T_1$ and $T_2$. Accordingly, even if the retardation coils $L_1$ and $L_2$ are coupled with each other through a common magnetic core, one of the coils dampens the sharp variation of the commutation current. At the firing angle of 0°, by contrast, only the thyristors $T_1$ and $T_2$ alternate conduction with each other. The commutation current in this case flows alternately in the opposite directions through the path including the winding $W_2$, the terminal $a$, the coil $L_1$, the thyristor $T_1$, the thyristor $T_2$, the coil $L_2$, the terminal $b$ and the winding $W_2$. By magnetically coupling the retardation coils $L_1$ and $L_2$ through a common magnetic core in the polarity as shown by the black dot, the variations of the magnetomotive force due to the commutation current components may be canalled each other, so that no inductance is offered. Thus, an application of the invention to the center tap type rectifier circuit makes it possible to attain the same advantage of the retardation coils in the converter utilizing a minimum number of thyristors or the like.

Figure 9:
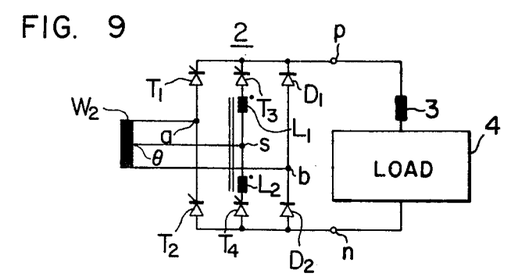

Another modification is shown in FIG. 9 in which the present invention is applied to another type of rectifier circuit. Principally, series-connected thyristors $T_1$ and $T_2$, series-connected thyristors $T_3$ and $T_4$ and series-connected diodes $D_1$ and $D_2$ are connected in parallel between common terminals $p$ and $n$ on the DC side of the rectifier 2 and the respective junction points of these three series connections of the thyristors $T_1$ and $T_2$, the thyristors $T_3$ and $T_4$ and the diodes $D_1$ and $D_2$ are connected to the three terminals $a$, $\theta$ and $b$ of the secondary winding $W_2$ of the transformer. The embodiment of FIG. 9 is featured in that the above-described fundamental circuit the retardation coils $L_1$ and $L_2$ are inserted between the terminal $s$ and the thyristors $T_3$ and between the terminal $s$ and the thyristor $T_4$ respectively and coupled with each other through a common magnetic core.

In the rectifier circuit 2 of FIG. 9, the thyristors $T_3$ and $T_4$ are fired so as to actuate the bridge rectifier circuit consisting of the thyristors $T_3$ and $T_4$ and the diodes $D_1$ and $D_2$ to rectify the AC voltage between the center tap $\theta$ and the terminal $b$ of the secondary winding $W_2$. Since the firing phase of the thyristors $T_3$ and $T_4$ is continuously controlled from 180° to 0°, the voltage between the DC output terminals $p$ and $n$ also undergoes a continuous charge. Incidentally, the configuration of the rectifier circuit of this embodiment is the same as that in FIG. 1 and therefore the function and operation of the retardation coils $L_1$ and $L_2$ are the same as described already.

When the firing phase of the thyristors $T_3$ and $T_4$ reaches 0°, the firing phase of the thyristors $T_1$ and $T_2$ is controlled from 180° toward 0° so as to more increase the voltage between the DC output terminals $p$ and $n$. In the meantime, the firing phase of the thyristors $T_3$ and $T_4$ is of course kept at 0°. Unless the firing phase of the thyristors $T_1$ and $T_2$ is 0°, the commutation operation from the thyristor $T_3$ to $T_1$ and from $T_4$ to $T_2$ is performed. In this case, the two commutation times between the thyristors $T_3$ and $T_1$ and between the thyristors $T_4$ and $T_2$ are different and therefore the retardation coils $L_1$ and $L_2$ offer an effective inductance.

When the firing phase of the thyristors $T_1$ and $T_2$ reaches zero degree, the thyristors $T_1$ and $T_3$ are fired at the same time. The thyristors $T_2$ and $T_4$ are also fired simultaneously. In this case the voltage at the terminal $a$ is higher than that at the center tap $\theta$ with respect to the terminal $b$. The thyristor $T_3$ and $T_4$ have no room at all to conduct, so that commutation is repeated only between diode $D_1$ and thyristor $T_1$ and between diode $D_2$ and thyristor $T_2$. In this case, the inductance of the retardation coils is ineffective. By the way, in the circuit of FIG. 9, a high voltage is also generated in the thyristors $T_3$ and $T_4$ by magnetically coupling the retardation coils $L_1$ and $L_2$. Insertion of an additional retardation coil for sharing the voltage is advantageous in such a manner that such an additional coil is preferably connected between the terminal $\theta$ and $s$ to minimize the number of such retardation coils.

Figure 10:
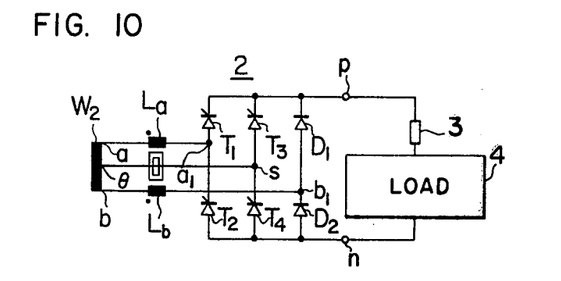

Instead of respectively connecting the retardation coils $L_1$ and $L_2$ in series with the thyristors $T_3$ and $T_4$ as in FIG. 9, a retardation coil $L_a$ may be preferably inserted between the terminal $a$ of the transformer winding $W_2$ and the junction point $a_1$ between the thyristors $T_1$ and $T_2$ and a retardation coil $L_b$ may be preferably inserted between the terminal $b$ and the junction point $b_1$ between the diodes $D_1$ and $D_2$, as shown in the circuit arrangement of FIG. 10. The retardation coils $L_a$ and $L_b$ are coupled with each other through a common magnetic core. In FIG. 10 the thyristors $T_3$ and $T_4$ are first fired. The rectifier circuit 2 operates as a bridge rectifier consisting of the thyristors $T_3$ and $T_4$ and the diodes $D_1$ and $D_2$ to rectify the voltage between the terminals $\theta$ and $b$. The retardation coil $L_b$, which is connected to the AC circuit, offers an effective inductance with respect to the commutation current. This condition remains unchanged even after the firing angle of the thyristors $T_3$ and $T_4$ reaches zero degree, when the thyristors $T_1$ and $T_2$ are fixed. If the firing angle of the thyristors $T_1$ and $T_2$ is not zero, commutation in a half-cycle period of the AC voltage occurs at different times from $D_1$ to $T_3$ and from $T_3$ to $T_1$. These two different commutations are accompanied by commutation current components in the retardation coils $L_b$ and $L_a$ at different times so that their inductances are offered effectively. When the firing angle of the thyristors $T_1$ and $T_2$ reaches zero degree, thyristors $T_3$ and $T_4$ have no room to conduct, but the only commutation that occurs is between the thyristor $T_1$ and the diode $D_1$ and between the thyristor $T_2$ and the diode $D_2$. Under the condition where the firing angle of the single-phase bridge rectifier circuit is zero degree, the same commutation current flows in the retardation coils $L_a$ and $L_b$ at the same time. Accordingly, if the coils are coupled with each other through a common magnetic core with the polarities shown by black dots in the drawing, the retardation coils offer no inductance with respect to such commutation current compounds.

This invention is applied effectively also to the system in which retardation coils are connected to the AC circuit as decribed above. Also in the circuit of FIG. 10, a high voltage is produced in the thyristors $T_1$ and $T_2$ and the diodes $D_1$ and $D_1$ by magnetically coupling the retardation coils $L_a$ and $L_b$. This voltage may be effectively reduced by another voltage-sharing retardation which is preferably inserted between the terminals $\theta$ and $s$ to minimize the total number of retardation coils.

The aforementioned embodiments are concerned with the cases in which retardation coils are connected to an independent converter. Such a converter system as to have a plurality of different types of controlled rectifier units each having independent power converting function is, however, often used, the respective units being controlled in sequence. In such a converter system having a plurality of controlled rectifier units, the units having commutation times which are different in the course of controlling operation but may coincide with each other at the end of the controlling operation, the controlled rectifier units may preferably provided with retardation coils and coupled through a common magnetic core, thereby making it possible to attain the advantage of the present invention.

Figure 11:
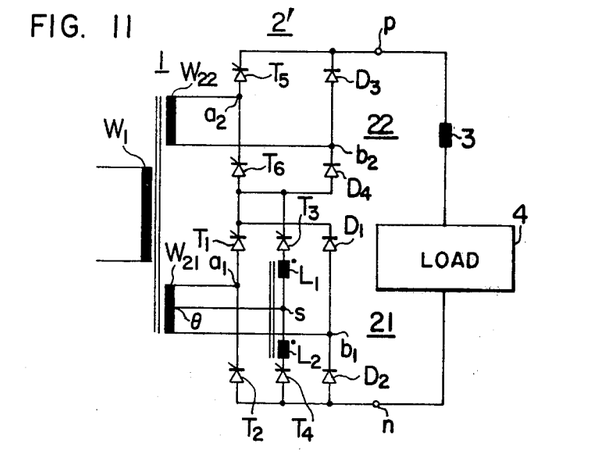

Each of the controlled rectifier units may of course be provided with a plurality of retardation coils magnetically coupled through a common magnetic core. This method, however, is not preferable in view of an increased number of retardation coils. In contrast, the embodiment of the invention shown in FIG. 11 employs only one pair of retardation coils. In this embodiment the rectifier circuit 2 is composed of two rectifier circuit units 21 and 22 the DC sides of which are connected in series. The rectifier circuit unit 21 has quite the same construction as the rectifier circuit shown in FIG. 9. The rectifier circuit unit 22, on the other hand, is a bridge type rectifier circuit composed of the diodes $D_3$ and $D_4$ and the thyristors $T_5$ and $T_6$. The transformer 1 has two secondary windings $W_{21}$ and $W_{22}$ of the same number of turns, which are connected to the rectifier circuit units 21 and 22 respectively. A series circuit consisting of the smoothing reactor 3 and the load 4 is connected between the DC terminals $p$ and $n$ of the rectifier circuit 2. The converting power of the rectifier circuit unit 22 is first maintained at zero without firing the thyristors $T_5$ and $T_6$ of the rectifier circuit unit 22. Under this condition, the rectifier circuit unit 21 is so controlled as to increase its converting power. When the converting power of the rectifier circuit unit 21 reaches a maximum level upon completion of the control thereof, the converting power of the rectifier circuit unit 21 is shifted to the rectifier circuit unit 22. In the process, the thyristors $T_5$ and $T_6$ of the rectifier circuit unit 22 are fired with the phase of 0° so as to attain a maximum converting power of the rectifier unit 22, while at the same time reducing the converting power of the rectifier circuit unit 21 to zero. The converting power of the rectifier circuit 2 as a whole remains unchanged if the secondary windings $W_{21}$ and $W_{22}$ have the same number of turns and produce the same voltage. The rectifier circuit unit 21 is again controlled under this condition. When the converting power of the rectifier circuit unit 21 reaches its maximum value at the end of the control thereof, the converting power of the rectifier circuit 2 also reaches its maximum value. In this control operation, the rectifier circuit unit 22 is used only for on-off control, while the rectifier circuit unit 21 is subjected to continuous phase control. Desired characteristics are thus obtained. In other words, the retardation coils $L_1$ and $L_2$ act effectively in such a manner as to reduce the higher harmonics component during the firing control, whereas the output of the rectifier circuit is maintained without any reduction under the condition of maximum output thereof. In addition, since the retardation coils $L_1$ and $L_2$ is connected to a rectifier circuit unit whose converting power is half of the whole converting power, the capacity of the retardation coils may be also reduced correspondingly.

All the aforementioned embodiments have a single-phase AC power supply and constitute applications of the invention to a rectifier circuit comprising a combination of thyristors and diodes. The present invention is generally applicable to a power converter system employing an AC power supply for the commutating operation of the thyristors and the diodes. For example, the present invention may be applied to such a power converter system having an AC power supply of three or more multiple phases. Also, the power converter system may be composed of thyristors without any diodes. Further, the invention is applicable to what is called the cycloconverter circuit for converting the direct current directly into the alternating current.

It will be thus understood from the foregoing description that according to the present invention it is possible to reduce the higher harmonics components of the AC input current without reducing the maximum converting power of the power converter system. Thus the various limitations so far imposed on the power converter system due to higher harmonics components are greatly relaxed.

I claim:

1. A power converter system for converting an alternating current into a desired power, comprising a transformer, a rectifier means including a combination of a plurality of rectifier elements, said rectifier means being connected through said transformer to said AC power supply, said AC power supply being utilized at the same time as a commutation power source for said rectifier elements, and a plurality of retardation coils connected in series with said rectifier elements at the AC power supply side of said rectifier means, said retardation coils being magnetically coupled with each other.

2. A power converter system according to claim 1, in which said rectifier means is a single-phase rectifier circuit which is composed of said rectifier elements connected in the form of bridge, said rectifier means including a plurality of controlled rectifier elements, and said retardation coils are provided at the side of the controlled rectifier elements whose firing phase is continuously controlled.

3. A power converter system according to claim 1, in which said rectifier means is a single-phase rectifier circuit which is composed of said rectifier elements connected in the form of bridge, each of said rectifier elements is provided with one of said retardation coils, and the retardation coils associated with the rectifier elements disposed in opposite arms of said bridge are magnetically coupled with each other.

4. A power converter system according to claim 1, in which said rectifier means includes a plurality of controlled rectifier elements and at least one uncontrolled rectifier element, said transformer includes a winding having two end terminals and a center tap, each of said two end terminals being connected through a retardation coil to an end of corresponding one of said controlled rectifier elements, said center tap being connected to an end of each uncontrolled rectifier element, the other ends of said controlled and uncontrolled rectifier elements being connected commonly.

5. A power converter system according to claim 1, in which said transformer includes a winding having a center tap and said rectifier means is a rectifier circuit of three-phase bridge connection, said rectifier means including controlled rectifier elements connected to said center tap of said transformer, said controlled rectifier elements connected to said center tap being provided with said retardation coils.

6. A power converter system according to claim 1, in which said transformer includes a winding having two end terminals and a center tap, and said rectifier means is a rectifier circuit of three-phase bridge connection composed of said rectifier elements, the AC input side terminals of said rectifier circuit being connected to said two end terminals and said center tap, said retardation coils being inserted between said two end terminals and said AC input side terminals.

7. A power converter system according to claim 1, in which said plurality of rectifier elements include controlled rectifier elements.

8. A power converter system according to claim 7, in which said plurality of rectifier elements further includes at least one uncontrolled rectifier element.

9. A power converter system comprising a rectifier circuit means whose AC input terminals are connected to an AC power supply through a transformer, said rectifier circuit means including a bridge connection of a plurality of rectifier elements, said AC power supply being utilized as a commutation power source for said rectifier elements, a plurality of retardation coils inserted in selected ones of the arms of said bridge connection respectively and correspondingly to the rectifier elements which are connected in series to each other to constitute said selected one arm, said retardation coils being magnetically coupled with each other, and another retardation coil inserted between a predetermined one of the two end terminals of said transformer and the AC input terminal of said rectifier circuit which is connected to said predetermined one end terminal.

10. A power converter system according to claim 9, in which said plurality of rectifier elements include controlled rectifier elements.

11. A power converter system according to claim 10, in which said plurality of rectifier elements further include at least one uncontrolled rectifier element.

12. A power converter system comprising an AC power supply, a transformer having a primary winding connected to said AC power supply and having a plurality of secondary windings, a plurality of rectifier circuit units each unit including a bridge connection of a plurality of rectifier elements, the DC output sides of the respective rectifier circuit units being connected in series with each other, and a plurality of retardation coils inserted in selected ones of the arms of selected ones of said rectifier units respectively and correspondingly to the rectifier elements which are connected in series to each other to constitute said selected one arm, said retardation coils being magnetically coupled with each other.

13. A power converter system according to claim 12, in which said plurality of rectifier elements include controlled rectifier elements.

14. A power converter system according to claim 13, in which said plurality of rectifier elements further includes at least one uncontrolled rectifier element.

15. A power converter system according to claim 12, in which a predetermined one of secondary windings to which the AC input terminals of said selected one of said rectifier circuit units has a center tap, said selected one of said rectifier circuit unit including a three-phase bridge circuit, said three-phase bridge circuit having AC input terminals connected respectively to two end terminals and said center tap, said retardation coils being inserted in said selected one arm whose AC input terminal is connected to said center tap respectively and correspondingly to the rectifier elements which constitute said selected one arm.

16. A power converter system according to claim 15, in which each of the rectifier circuit units other than said selected one rectifier circuit unit includes a single-phase bridge circuit.

17. A power converter system according to claim 16, in which each of said secondary windings of said transformer has the same number of turns.

18. A power converter system according to claim 17, in which the output of said selected one rectifier circuit unit is controlled continuously, whereas the outputs of the other rectifier circuit units are subjected to on-off control.

* * * * *